Patented Oct. 27, 1942

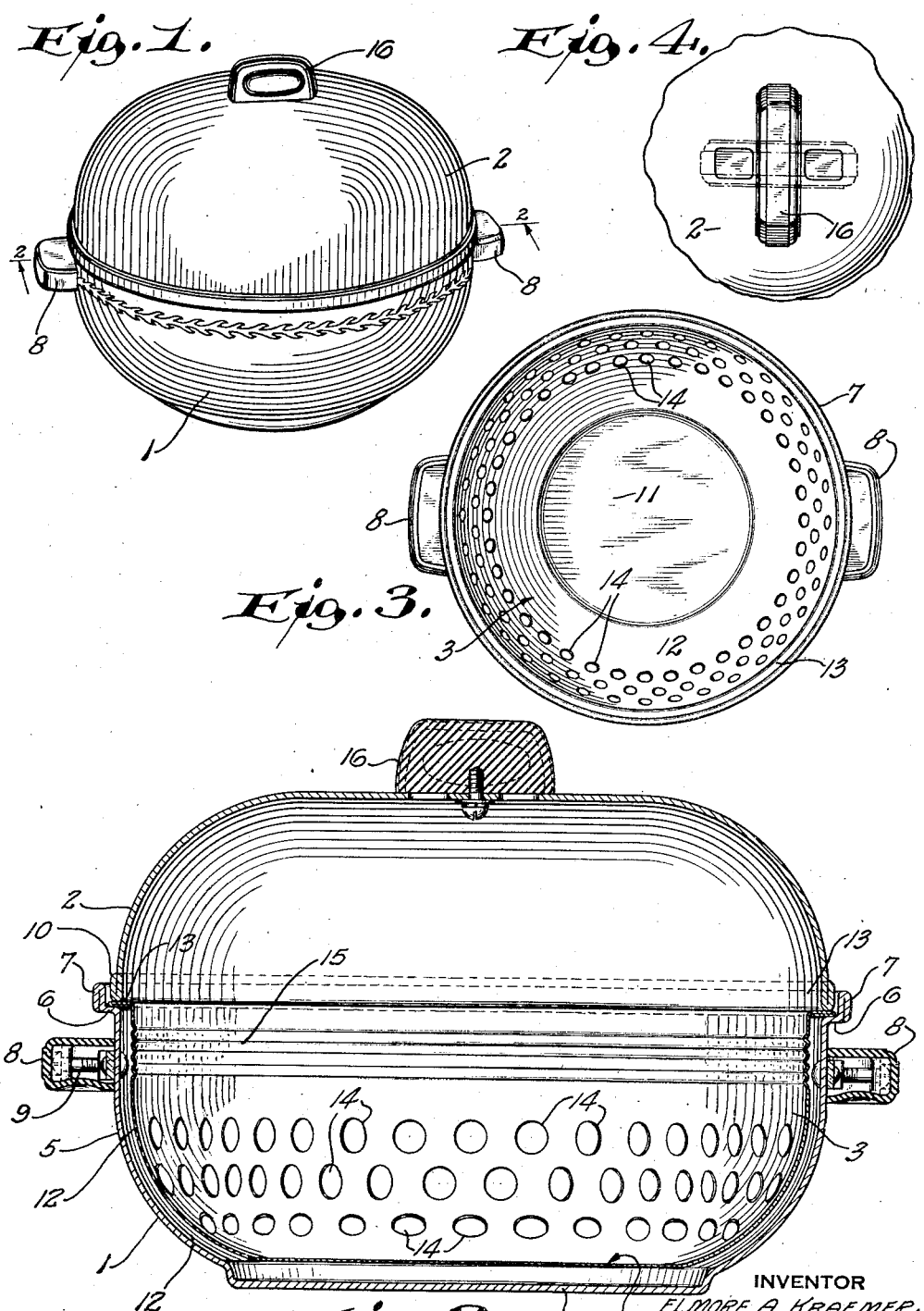

2,299,995

UNITED STATES PATENT OFFICE 2,299,995

SERVING OVEN

Elmore A. Kraemer, West Bend, Wis., assignor to West Bend Aluminum Company, West Bend, Wis., a corporation of Wisconsin Application October 19, 1939, Serial No. 300,141

2 Claims. (Cl. 53—6)

This invention relates to an improvement in cooking utensils, and more particularly to a serving oven designed to cook or heat food, and also to facilitate the serving thereof.

The present invention is in the nature of an improvement on Patent 2,170,904, granted August 29, 1939, to R. N. Kircher, for "Serving oven," and assigned to the assignee of the present application.

The object of the present invention is to provide a serving oven of this character, which has the advantages and capacities of the structure of said patent, and also has the further advantage of providing positive protection for all types of food against scorching or burning, in that even though the food be flaky or granular in whole or in part, it will be maintained out of direct contact with the high heated base section of the oven, and yet the structure is so constituted and organized as to insure highly efficient application of the heat to the food being treated.

Another object of the invention is to provide a serving oven having these advantages, and which is simple and durable in construction, highly attractive in appearance, efficient in operation, and easy and comparatively inexpensive to manufacture.

Other objects and advantages reside in certain novel features of the construction, arrangement, and combination of parts, which will be hereinafter more fully described and particularly pointed out in the appended claims, reference being had to the accompanying drawing forming a part of this specification, and in which:

Figure 1 is a perspective view showing the serving oven embodying the present invention.

Figure 2 is a view thereof in diametrical vertical cross section.

Figure 3 is a view in top plan of the base section of the utensil showing the food-retaining basket having an imperforate bottom and lower portion and a reticulated side wall.

Figure 4 is a fragmentary view in top plan showing the combined knob and vent closure in its open venting position.

Referring to the drawing it will be seen that the serving oven embodying the present invention comprises generally a base section 1, a cover section 2, and a food-holding basket or receptacle 3.

The base section 1 and the cover section 2 are generally of the form of a salad bowl, the cover section 2, of course, being in the form of an inverted bowl in the assembly.

The base section 1 includes an imperforate bottom 4 and an integral imperforate bowl-like body portion 5, provided around its upper open end with an outwardly directed horizontal flange 6 presenting an upwardly facing shoulder or seat, the flange 6 being surrounded by a vertical flange 7 integral therewith, the flange 7 being doubled upon itself to provide a rim or bead structure around the margin of the upper open end of the base section.

Handles 8 of Bakelite or other heat-insulating material are secured to diametrically opposite portions of the body and are applied to the base section by means of screws or fastening devices 9.

The cover section 2 is, as indicated, in the form of an inverted bowl and has the margin of its lower open end beaded or reinforced by doubling back or folding upon itself the material which constitutes the cover section in the manner designated at 10, thereby providing a beaded edge or rim which is designed to interfit with the rim or bead 7 of the base section, and to be supported indirectly on the annular seat presented by the horizontal flange of the base section.

The food basket or receptacle 3 is also in the form of a bowl-like structure of sheet metal, and has an imperforate bottom portion 11 and an integral bowl-like body portion 12 corresponding in its formation or shape to that of the bowl-like body portion of the base section 1, but smaller so that in the assembly it is spaced throughout its extent from the base section, the space between the food basket and the base section being designated at 12. Around the upper edge of the bowl-like body portion of the food receptacle or basket 3 is an integral, outwardly directed, annular flange 13, which may also be doubled, and which is shaped and designed to snugly engage and be supported by the annular seat provided by the flange 6 of the base section 1, the rim 10 of the cover 2 in turn resting on top of the flange 10 of the food basket or receptacle 3. The bowl-like body portion of the food basket or receptacle 3 in a zone above the bottom 11 thereof is provided with a multiplicity of holes 14 which facilitate the interchange of heat between the base section 1 and the food contained in the basket or receptacle 3, although the imperforate bottom 11 and imperforate lower portion of the body of the basket or receptacle 3 above the bottom 11 and below the holes 14 form a dish-like bottom which prevents particles of the food from dropping to the highly heated bottom 4 of the base section and being scorched or burned therein. Above the holes 14 the body of the basket is again imperforate and preferably is provided with a plurality of circumferentially extending corrugations 15 to strengthen the structure and increase the heat conductive areas which it provides between the base section and the food contained in the basket.

The cover section 2 may be provided with a combined knob and vent closure 16, as in Patent No. 2,170,904 referred to hereinabove.

A device of this character may be placed on the top of the gas flame or over the electric heating element of an electric stove, or any suitable heat-conducting relation with any other source of heat. The heat is directly applied to the base section and is transmitted with maximum efficiency into the interior of the basket to effectively heat the food therein. By having the bottom of the receptacle or basket 3, and also the lower portion of the body thereof imperforate, as well as out of contact with the bottom 4 of base section 1, the food is always maintained out of contact with the highly heated bottom of the base section, and will not be scorched or burned although it will be most effectively heated. For example, if the device is employed for heating sugar buns, or the like, and particles of sugar drop off of the buns, they will collect on the imperforate bottom portion of the food receptacle 3 and will not come in contact with the highly heated bottom 4 of the base section 1. The same advantage will be realized if the oven is used to heat or refreshen flaky or granular cereals or the like. The food may not only be heated in the utensil but may be served therefrom.

Where the utensil is employed as a serving oven the cover section and base section may be advantageously made up of sheet metal of high thermal conductivity, as for example aluminum, so that the heat will be transmitted with maximum efficiency from the source to the contents of the utensil. It is usually desirable, however, to constitute the food receptacle or basket of metal of a different character, sheet steel for example, although if desired it also may be constituted of aluminum. By having it constituted of a metal of relatively less heat conductivity than the base and cover sections the food may be effectively heated without danger of burning. Where the utensil is employed as a food container, it may be desirable to constitute the base, cover, and food receptacle of sheet steel, or similar metal.

While I have shown and described one construction in which the invention may be advantageously embodied, it is to be understood that the construction shown has been selected merely for the purpose of illustration or example, and that various changes in the size, shape, and arrangement of the parts may be made without departing from the spirit of the invention or the scope of the subjoined claims.

I claim:

1. A serving oven comprising a base section, a food receptacle disposed within said base section, said receptacle having a flat imperforate bottom portion, and vertical side walls joined to said bottom portion by a curved portion, said curved portion being provided with a multiplicity of closely spaced holes, the lowermost of said holes being spaced from said bottom so that an imperforate dish-like bottom is formed by said bottom portion and the adjacent imperforate part of said curved portion, means on said side walls to hold said receptacle within said base section with its bottom portion, side walls, and curved portion in spaced relation to the base section, and a cover section for said base section.

2. A serving oven comprising a base section, a food receptacle disposed within said base section, said receptacle having a flat imperforate bottom portion, and vertical side walls joined to said bottom portion by a curved portion, said curved portion being provided with a multiplicity of closely spaced holes, the lowermost of said holes being spaced from said bottom so that an imperforate dish-like bottom is formed by said bottom portion and the adjacent imperforate part of said curved portion, said side walls above said curved portion being provided with circumferential corrugations, means on said side walls to hold said receptacle within said base section with its bottom portion, side walls, and curved portion in spaced relation to the base section, and a cover section for said base section.

ELMORE A. KRAEMER.